United States Patent
Aiba et al.

(10) Patent No.: US 9,920,187 B2
(45) Date of Patent: Mar. 20, 2018

(54) HNBR COMPOSITION AND HNBR CROSSLINKED BODY

(71) Applicant: NOK Corporation, Tokyo (JP)

(72) Inventors: Takafumi Aiba, Kanagawa (JP); Hideyuki Murakami, Kanagawa (JP); Kenichi Uchida, Kanagawa (JP); Akira Morio, Kangawa (JP); Hiroaki Sato, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/128,335

(22) PCT Filed: Mar. 20, 2015

(86) PCT No.: PCT/JP2015/058613
§ 371 (c)(1),
(2) Date: Sep. 22, 2016

(87) PCT Pub. No.: WO2015/146862
PCT Pub. Date: Oct. 1, 2015

(65) Prior Publication Data
US 2017/0130032 A1    May 11, 2017

(30) Foreign Application Priority Data
Mar. 28, 2014 (JP) .................. 2014-067872

(51) Int. Cl.
| | | |
|---|---|---|
| *C08K 7/06* | (2006.01) | |
| *C08K 3/04* | (2006.01) | |
| *C08L 15/00* | (2006.01) | |
| *F16J 15/3284* | (2016.01) | |
| *C08K 7/10* | (2006.01) | |
| *F16H 55/56* | (2006.01) | |

(52) U.S. Cl.
CPC .................. *C08K 7/06* (2013.01); *C08K 3/04* (2013.01); *C08K 7/10* (2013.01); *C08L 15/00* (2013.01); *F16H 55/56* (2013.01); *F16J 15/3284* (2013.01); *C08K 2201/003* (2013.01); *C08K 2201/006* (2013.01)

(58) Field of Classification Search
CPC .......... F16J 15/3284; C08K 3/04; C08K 7/06; C08K 7/10; C08K 2201/003; C08K 2201/006
See application file for complete search history.

(56) References Cited

U.S. PATENT DOCUMENTS

| | | | |
|---|---|---|---|
| 8,975,316 B2 * | 3/2015 | Belmont ................ | C08K 9/04 524/105 |
| 2013/0165560 A1 * | 6/2013 | Belmont ................ | C08K 9/12 524/105 |
| 2013/0202235 A1 * | 8/2013 | Ninomiya ............ | F16C 33/723 384/448 |
| 2015/0183962 A1 * | 7/2015 | Belmont ............... | B60C 1/0016 523/155 |

FOREIGN PATENT DOCUMENTS

| | | |
|---|---|---|
| JP | 01287151 A | 11/1989 |
| JP | 4124338 B | 5/2008 |
| JP | 4779068 B | 7/2011 |
| JP | 5150920 B | 12/2012 |
| JP | 5158917 B | 12/2012 |
| JP | 5261735 B | 5/2013 |

* cited by examiner

*Primary Examiner* — Gilbert Y Lee
(74) *Attorney, Agent, or Firm* — K. David Crockett, Esq.; Niky Economy Syrengelas, Esq.; Crockett & Crockett, PC

(57) ABSTRACT

An object of the present invention is to provide an HNBR composition and an HNBR crosslinked body excellent in abrasion resistance and pressure resistance. The object is achieved by an HNBR composition containing 3 to 20 parts by weight of carbon fibers or wollastonite as a hard filler per 100 parts by weight of a hydrogenated nitrile rubber and containing 72 to 87 parts by weight of a carbon black having an average particle diameter of 40 to 50 nm, an iodine adsorption of 35 to 49 g/kg, and a DBP oil absorption of 100 to 160 ml/100 g, as well as an HNBR crosslinked body acquired by crosslinking the HNBR composition.

10 Claims, No Drawings

HNBR COMPOSITION AND HNBR CROSSLINKED BODY

FIELD OF THE INVENTIONS

The present invention relates to an HNBR composition and an HNBR crosslinked body and more particularly to an HNBR composition and an HNBR crosslinked body excellent in abrasion resistance and pressure resistance.

BACKGROUND OF THE INVENTIONS

In the context of low-carbon society, lower fuel consumption of automobiles is recently strongly requested. With regard to transmissions of automobiles, CVT (continuously variable transmission) (stepless transmission) vehicles accordingly tend to increase.

A CVT is a kind of stepless transmissions made up of two pulleys and one belt. The CVT has a structure in which a pulley portion is made up of a combination of a primary side (input side) and a secondary side (output side) with the belt connecting therebetween. The CVT has a mechanism varying the widths of the pulleys to change the contact radiuses between the pulleys and the belt so that the radius of rotation of the belt varies to change a gear ratio in a stepless manner.

When the gear ratio is changed by varying the widths in the pulley portion, the pulley portion rotates and reciprocates at high speed. A seal used in the pulley portion rotates and reciprocates together. An improvement in sealing performance can therefore contribute to an improvement in fuel consumption. For example, expected effects include elimination of an electric oil pump (reduction in unit weight), application of an idle stop mechanism, and ability to be towed.

An improvement in sealing performance can simply be achieved at low cost by using a rubber squeeze packing. However, since the seal finely vibrates in association with belt rotation, the CVT pulley portion is in an environment in which the rubber squeeze packing is easily worn and, therefore, excellent abrasion resistance is required in addition to the sealing performance.

In general, sealing rings are mainly used as pulley portion seals for CVT. A conventional purpose of seals is to allow pulleys to operate and to retain an oil pressure.

However, the sealing rings are seals for the purpose of retaining a pressure of fluid in a hydraulic circuit rather than the purpose of restraining fluid from leaking outside. Therefore, the sealing rings have a problem of poor sealing properties unable to establish an idling stop system with an electric oil pump eliminated.

On the other hand, D-rings can ensure sealing properties as compared to the sealing rings and, therefore, studies have been conducted for using the D-rings for pulley portion seals for CVT.

CVT pulleys have two sealing portions in a primary portion on the input side and a secondary portion on the output side. As described above, since both the primary portion and the secondary portion are subjected to fine vibrations associated with belt rotation as described above, high friction force is generate at close contact positions between the D-rings and a housing, and the D-rings are required to have abrasion resistance.

The primary portion and the secondary portion have different sealing pressures and the secondary portion is in a higher pressure environment. Therefore, excessive friction generated due to protrusion to an R-portion may damage a protrusion portion in the secondary portion and, as a result, the form of the D-ring may no longer be made. Thus, the D-rings used as pulley portion sealing materials for CVT are required to have pressure resistance.

From above, a material excellent in abrasion resistance and pressure resistance is required.

In this regard, as described in Patent Document 1, a technique has typically been used for containing carbon fibers so as to improve sliding characteristics such as abrasion resistance. In the formulation of Patent Document 1, 65 to 200 parts by weight of carbon fibers are contained per 100 parts by weight of hydrogenated nitrile rubber.

It is also disclosed in Patent Document 1 that a carbon black is contained for improving abrasion resistance characteristics.

It is disclosed also in Patent Documents 2, 3, and 4 that a carbon black may be used in addition to carbon fibers for improving abrasion resistance characteristics.

It is disclosed in Patent Document 5 that, to acquire a highly-elastic rubber composition excellent in crack growth resistance and impact resilience with high heat conductivity, vapor-phase grown carbon fibers and a carbon black are contained in a natural rubber and/or a synthetic rubber. The formulation includes 3 to 60 parts by weight of vapor-phase grown carbon fibers per 100 parts by weight of a natural rubber and/or a synthetic rubber, and a carbon black (with DBP oil absorption of 90 to 140 ml/100 g) having a weight ratio of 0.1 to 13 to the vapor-phase grown carbon fibers (with average diameter of 0.01 to 4 μm). By containing the vapor-phase grown carbon fibers and the carbon black, the concentration of stress of the ends of the vapor-phase grown carbon fibers is alleviated and, therefore, the crack growth resistance inherently possessed by the vapor-phase grown carbon fibers is sufficiently provided.

Patent Document 6 discloses a rubber molded article acquired by crosslinking (vulcanization) of a rubber composition containing a hydrogenation nitrile rubber, a carbon black B and a carbon black C, and/or carbon fibers as a sealing member having appropriate hardness and excellent in formability and abrasion resistance used as a sealing member used in a sealing portion associated with sliding. It is disclosed that the molded article having appropriate hardness and excellent in abrasion resistance is acquired by specifying a carbon black having a DBP oil absorption of 250 to 450 ml/100 g as the carbon black B. It is also described that by using the carbon black (C) having a DBP oil absorption specified to 200 ml/100 g or less, the molded article excellent in abrasion resistance is acquired while maintaining appropriate hardness and favorable formability.

PRIOR ART DOCUMENTS

Patent Documents

Patent Document 1: JP-B-4124338
Patent Document 2: JP-B-4779068
Patent Document 3: JP-B-5261735
Patent Document 4: JP-B-5150920
Patent Document 5: JP-A-1-287151
Patent Document 6: JP-B-5158917

SUMMARY

Problem to be Solved by the Invention

However, when the conventional materials described above are used as pulley portion sealing material D-rings, desired abrasion resistance cannot be achieved because of excessive friction due to oil film shortage even if a hard hydrogenated nitrile rubber (HNBR) material is used. On the other hand, the conventional materials have a problem of pressure resistance degraded by addition of carbon fibers.

Therefore, a problem to be solved by the present invention is to provide an HNBR composition and an HNBR crosslinked body excellent in abrasion resistance and pressure resistance.

Other problems to be solved by the present invention will become apparent from the following description.

Means for Solving Problem

The problem is solved by the following aspects of the invention.

1. An HNBR composition containing 3 to 20 parts by weight of carbon fibers or wollastonite as a hard filler per 100 parts by weight of a hydrogenated nitrile rubber and containing 72 to 87 parts by weight of a carbon black having an average particle diameter of 40 to 50 nm, an iodine adsorption of 35 to 49 g/kg, and a DBP oil absorption of 100 to 160 ml/100 g.

2. The HNBR composition according to 1, wherein the carbon black is FEF carbon black or FEF-LS carbon black.

3. An HNBR crosslinked body acquired by crosslinking the HNBR composition according to 1 or 2.

4. Use of the HNBR crosslinked body according to 3 as a sealing material in a pulley portion for CVT.

5. A sealing material in a pulley portion for CVT acquired by molding the HNBR crosslinked body according to 3.

6. The sealing material in a pulley portion for CVT according to 5, wherein the sealing material is a D-ring.

Effect of the Invention

The present invention can provide the HNBR composition and the HNBR crosslinked body excellent in abrasion resistance and pressure resistance.

DETAILED DESCRIPTION OF THE INVENTIONS

Embodiments of the present invention will now be described.

<HNBR Composition>

An HNBR composition excellent in abrasion resistance and pressure resistance of the present invention is acquired by containing the following amount of carbon fibers or wollastonite as a hard filler in a hydrogenated nitrile rubber polymer and containing the following amount of a carbon black having an average particle diameter of 40 to 50 nm, an iodine adsorption of 35 to 49 g/kg, and a DBP oil absorption of 100 to 160 ml/100 g.

1. Polymer

HNBR is a rubber acquired by selectively hydrogenating only the carbon-carbon double bonds in NBR and is characterized by improved ageing and heat resistance, weather resistance, and chemical resistance as compared to nitrile rubber.

Commercially available HNBR polymers are usable and, although specific examples include "Zetpol 2010 (iodine value 11)" manufactured by Zeon Corporation, any generally usable polymer can be used without particular limitation.

2. Hard Filler

Carbon fibers or wollastonite is used as a hard filler in the present invention.

By adding carbon fibers or wollastonite as a hard filler, unevenness can be added to a sliding surface of a product. The addition of unevenness enables formation of sufficient oil film thickness, and a reduction in friction coefficient due to fluid lubrication reduces abrasion.

On the other hand, generally used fillers such as carbon black are uniformly worn by sliding and unable to form sufficient unevenness on a surface. A flat sliding surface without unevenness cannot form sufficient oil film thickness and leads to sliding in a mixed lubrication or boundary lubricating region due to oil film shortage, resulting in excessive friction because of a large friction coefficient.

Although the abrasion resistance is improved by adding carbon fibers or wollastonite, a large size thereof makes a reinforcing property smaller than carbon black, and the pressure resistance is therefore degraded. This problem is solved by adding a certain carbon black described later.

An amount of carbon fibers or wollastonite is within a range of 3 to 20 parts by weight, preferably within a range of 7.5 to 15 parts by weight, per 100 parts by weight of a hydrogenated nitrile rubber.

If the range of 3 to 20 parts by weight is not satisfied, the abrasion resistance characteristics and the pressure resistance characteristics are unfavorably degraded.

The carbon fibers having an arithmetic mean fiber length of 30 to 80 μm and an arithmetic mean fiber diameter of 10 to 15 μm are preferably usable.

Commercially available carbon fibers are usable and, although specific examples include "DIALEAD K6371M" of Mitsubishi Chemical Functional Products, any generally usable carbon fibers can be used without particular limitation.

The wollastonite having an arithmetic mean fiber length of 20 to 40 μm and an arithmetic mean fiber diameter of 5 to 10 μm is preferably usable.

Commercially available wollastonite is usable and, although specific examples include "NYAD-400" of TOMOE engineering, any generally usable wollastonite can be used without particular limitation.

3. Carbon Black

The carbon black used in the present invention is a carbon black having an average particle diameter of 40 to 50 nm, an iodine adsorption of 35 to 49 g/kg, and a DBP oil absorption of 100 to 160 ml/100 g and, preferably, a carbon black having an average particle diameter of 40 to 50 nm, an iodine adsorption of 40 to 49 g/kg, and a DBP oil absorption of 110 to 120 ml/100 g.

The carbon black used in the present invention is preferably FEF carbon black and, in the present invention, the FEF carbon black refers to FEF (fast extruding furnace) carbon black, FEF-LS carbon black, and FEF-HS carbon black, and one or two types can be selected and used from these carbon blacks. Particularly, the FEF carbon black and the FEF-LS carbon black are preferable, and the FEF carbon black is more preferable.

The iodine adsorption and the DBP oil absorption are typical indexes indicative of characteristics of carbon black and the iodine adsorption is a value measured based on JIS K6221 while the DBP oil absorption is a value measured in accordance with a method A (machine method) of JIS K6221.

The iodine adsorption is the index of a total specific surface area including pores of carbon black as is the case with a nitrogen absorption specific surface area. The DBP oil absorption is used for indirectly quantifying a structure by measuring a porosity between individual aggregates having positive correlation with the structure. The iodine adsorption and the DBP oil absorption indicate the levels of these respective characteristic values having significant impacts on reinforcing properties, extrusion characteristics, dispersiveness, tinting strength, viscosity, and conductivity when carbon black is contained in a rubber composition.

The average particle diameter is an average diameter measured and calculated from an electron micrograph of small spherical components (having contours formed by fine crystals and inseparable) making up a carbon black aggregate, and this is the same as the definition of particle diameter described in Carbon Black Yearbook 1998, No. 48, published by Carbon Black Association. When the average particle diameter is calculated in the present invention, an arithmetic mean is used.

In the present invention, it is preferable to use the carbon black having an average particle diameter of 40 to 50 nm, an iodine adsorption of 35 to 49 g/kg, and a DBP oil absorption of 100 to 160 ml/100 g for acquiring the abrasion resistance characteristics and the pressure resistance characteristics.

Although the HNBR composition of the present invention is improved in abrasion resistance by adding carbon fibers or wollastonite, a large particle diameter thereof makes a reinforcing property smaller than conventionally used carbon black, and the pressure resistance characteristics therefore tend to degrade. This problem can be solved by adding the carbon black having an average particle diameter of 40 to 50 nm, an iodine adsorption of 35 to 49 g/kg, and a DBP oil absorption of 100 to 160 ml/100 g.

The carbon black preferably used in the present invention is can be obtained as a commercially-available product and, although specific examples include "SEAST G-SO" of TOKAI CARBON (average particle diameter: 43 nm, iodine adsorption: 45 g/kg, DBP oil absorption: 115 ml/100 g) and "Asahi #60" of ASAHI CARBON (average particle diameter: 45 nm iodine adsorption: 43 g/kg, DBP oil absorption: 114 ml/100 g), any generally usable carbon black can be used without particular limitation.

An amount of carbon black is within a range of 72 to 87 parts by weight, preferably within a range of 75 to 85 parts by weight, per 100 parts by weight of hydrogenated nitrile rubber.

If the range of 72 to 87 parts by weight is not satisfied, the abrasion resistance characteristics and the pressure resistance characteristics are unfavorably degraded.

4. Organic Peroxide

The HNBR composition is preferably crosslinked by 1 to 6 parts by weight of an organic peroxide contained per 100 parts by weight of HNBR.

Examples of the organic peroxide include tertiary-butyl peroxide, dicumyl peroxide, tertiary-butylcumyl peroxide, 1,1-di(tertiary-butyl peroxy)-3,3,5-trimethylcyclohexane, 2,5-dimethyl-2,5-di(tertiary-butyl peroxy)hexane, benzoyl peroxide, dilauroyl peroxide, and 1,3-di(tertiary-butyl peroxyisopropyl)benzene, and any organic peroxide generally usable for crosslinking of HNBR can be used without particular limitation.

5. Other Compounding Agents

Compounding agents commonly used in the rubber industry are appropriately added and used as needed, including vulcanizing accelerator aids (e.g., metallic oxides such as zinc oxide, active zinc flower, surface-treated zinc flower, composite zinc flower, and magnesium oxide; metal carbonates such as zinc carbonate; metal hydroxides such as calcium hydroxide; and organic activators such as stearic acid), vulcanizing accelerators (e.g., sulfenamide-based, thiuram-based), antioxidants (e.g., amine-based, phenol-based), softeners and plasticizers (e.g., paraffin-based softeners, aromatic softeners, naphthene-based softeners), reinforcing agents or fillers (e.g., carbon black, silica), and processing aids (e.g., lubricants such as stearic acid).

<HNBR Crosslinked Body>

1. Preparation of HNBR Composition

In the presence invention, the HNBR composition is prepared through kneading by using a kneading machine such as an intermix, a kneader, a Banbury mixer, or an open roll.

2. Crosslinking (Vulcanization)

Crosslinking (vulcanization) of a kneaded material is performed by using a vulcanizing press, a compression molding machine, an injection molding machine, etc., typically through heating to about 150 to 200° C. for about 3 to 60 minutes and oven vulcanization (secondary vulcanization) may also be performed as need at 120 to 200° C. for about 1 to 24 hours.

3. Use of HNBR Crosslinked Body

The HNBR crosslinked body (crosslinked rubber) of the present invention is used as a sealing material and is preferably used as any one or more of sealing materials for pressure resistance, sliding, and motion. The sealing materials include both static sealing and dynamic sealing and are particularly preferably used for pulley portion D-rings of CVT (continuously variable transmission) and also used for O-rings for DCT (dual clutch transmission) etc.

EXAMPLES

Examples of the present invention will be described. The present invention is not limited to these examples.

Example 1 hydrogenated nitrile rubber ("Zetpol 1020" manufactured by Zeon Corporation) 100 parts by weight;

carbon black ("Asahi #60" manufactured by NSCC Carbon; average particle diameter: 45 nm, iodine adsorption: 43 g/kg, DBP oil absorption: 114 ml/100 g) 80 parts by weight;

carbon fibers ("DIALEAD K6371M" manufactured by Mitsubishi Chemical Functional Products; arithmetic mean fiber length: 55 μm, arithmetic mean fiber diameter: 11 μm) 10 parts by weight;

vulcanizing agent (dicumyl peroxide) ("PERBUTYL P" manufactured by Nippon Oil & Fats) 4 parts by weight After the above components were kneaded by a kneader and an open roll, crosslinking (vulcanization) of the kneaded material was performed by a vulcanizing press at 180° C. for 8 minutes to acquire JIS-prescribed circular test pieces (120 mm in diameter, 2 mm in thickness) and JIS-prescribed dumbbell No. 4 test pieces (100 mm in length, 15 mm in width, 2 mm in thickness).

<Evaluation Method>

(1) Abrasion Resistance Characteristics (Abrasion Characteristic Test)

The test pieces were ground with a grindstone under the following conditions to conduct a Taber abrasion test in accordance with JIS K6264-2 (2005) so as to evaluate the abrasion resistance characteristics based on a Taber abrasion amount (mg):

test piece shape: JIS-prescribed circular test piece (120 mm in diameter, 2 mm in thickness);

test temperature: 25° C.;

frequency: 1 Hz;

load: 1N; and number of abrasion cycles: 1000.

An abrasion amount was calculated from a difference in weight of a test piece between before and after abrasion to evaluate a material with an abrasion amount less than 110 mg as being good and a material with an abrasion amount of 110 mg or more as being poor.

(2) Pressure Resistance Characteristics (Hysteresis Loss Evaluation Test)

A stress-stroke curve (s-s curve) was obtained by using Autograph "AG-IS 100kN" manufactured by Shimadzu Corporation to calculate elastic energy in deformation/recovery.

The test pieces were repeatedly deformed to a constant stress and recovered under the following conditions:
test piece shape: JIS-prescribed dumbbell No. 4 test piece;
test temperature: 150° C.;
maximum stress: 5 MPa; and
number of cycles: 50.

A hysteresis loss was calculate by subtracting the total sum of elastic energy in recovery from the total sum of elastic energy in deformation to evaluate a material with a hysteresis loss less than 3.2 J as being good and a material with a hysteresis loss of 3.2 J or more as being poor.

It can be evaluated that, when the HNBR crosslinked body is used as a sealing material D-ring for CVT, occurrence of gouging of a protrusion portion can be suppressed by reducing the hysteresis loss.

Example 2

A crosslinked rubber sample was molded in the same way as Example 1 except that the amount of FEF carbon black is changed to 75 parts by weight, and was evaluated in the same way, and the result is described in Table 1.

Example 3

A crosslinked rubber sample was molded in the same way as Example 1 except that the amount of FEF carbon black is changed to 85 parts by weight, and was evaluated in the same way, and the result is described in Table 1.

Example 4

A crosslinked rubber sample was molded in the same way as Example 1 except that the amount of carbon fibers is changed to 7.5 parts by weight, and was evaluated in the same way, and the result is described in Table 1.

Example 5

A crosslinked rubber sample was molded in the same way as Example 1 except that the amount of carbon fibers is changed to 15 parts by weight, and was evaluated in the same way, and the result is described in Table 1.

Example 6

A crosslinked rubber sample was molded in the same way as Example 1 except that the amount of FEF carbon black is changed to 75 parts by weight and that the amount of carbon fibers is changed to 7.5 parts by weight, and was evaluated in the same way, and the result is described in Table 1.

Example 7

A crosslinked rubber sample was molded in the same way as Example 1 except that the amount of FEF carbon black is changed to 75 parts by weight and that the amount of carbon fibers is changed to 15 parts by weight, and was evaluated in the same way, and the result is described in Table 1.

Example 8

A crosslinked rubber sample was molded in the same way as Example 1 except that the amount of FEF carbon black is changed to 85 parts by weight and that the amount of carbon fibers is changed to 7.5 parts by weight, and was evaluated in the same way, and the result is described in Table 1.

Example 9

A crosslinked rubber sample was molded in the same way as Example 1 except that the amount of FEF carbon black is changed to 85 parts by weight and that the amount of carbon fibers is changed to 15 parts by weight, and was evaluated in the same way, and the result is described in Table 1.

Example 10

A crosslinked rubber sample was molded in the same way as Example 1 except that 10 parts by weight of carbon fibers are changed to 10 parts by weight of wollastonite ("NYAD 400" manufactured by TOMOE engineering; fiber length: 35 µm, fiber diameter: 7 µm), and was evaluated in the same way, and the result is described in Table 2.

Example 11

A crosslinked rubber sample was molded in the same way as Example 1 except that the amount of FEF carbon black is changed to 75 parts by weight and that 10 parts by weight of carbon fibers are changed to 10 parts by weight of wollastonite ("NYAD 400" manufactured by TOMOE engineering; fiber length: 35 µm, fiber diameter: 7 µm), and was evaluated in the same way, and the result is described in Table 2.

Example 12

A crosslinked rubber sample was molded in the same way as Example 1 except that the amount of FEF carbon black is changed to 85 parts by weight and that 10 parts by weight of carbon fibers are changed to 10 parts by weight of wollastonite ("NYAD 400" manufactured by TOMOE engineering; fiber length: 35 µm, fiber diameter: 7 µm), and was evaluated in the same way, and the result is described in Table 2.

Example 13

A crosslinked rubber sample was molded in the same way as Example 1 except that 10 parts by weight of carbon fibers are changed to 7.5 parts by weight of wollastonite ("NYAD 400" manufactured by TOMOE engineering; fiber length: 35 µm, fiber diameter: 7 µm), and was evaluated in the same way, and the result is described in Table 2.

Example 14

A crosslinked rubber sample was molded in the same way as Example 1 except that 10 parts by weight of carbon fibers are changed to 15 parts by weight of wollastonite ("NYAD 400" manufactured by TOMOE engineering; fiber length: 35

μm, fiber diameter: 7 μm), and was evaluated in the same way, and the result is described in Table 2.

Example 15

A crosslinked rubber sample was molded in the same way as Example 1 except that the amount of FEF carbon black is changed to 75 parts by weight and that 10 parts by weight of carbon fibers are changed to 7.5 parts by weight of wollastonite ("NYAD 400" manufactured by TOMOE engineering; fiber length: 35 μm, fiber diameter: 7 μm), and was evaluated in the same way, and the result is described in Table 2.

Example 16

A crosslinked rubber sample was molded in the same way as Example 1 except that the amount of FEF carbon black is changed to 75 parts by weight and that 10 parts by weight of carbon fibers are changed to 15 parts by weight of wollastonite ("NYAD 400" manufactured by TOMOE engineering; fiber length: 35 μm, fiber diameter: 7 μm), and was evaluated in the same way, and the result is described in Table 2.

Example 17

A crosslinked rubber sample was molded in the same way as Example 1 except that the amount of FEF carbon black is changed to 85 parts by weight and that 10 parts by weight of carbon fibers are changed to 7.5 parts by weight of wollastonite ("NYAD 400" manufactured by TOMOE engineering; fiber length: 35 μm, fiber diameter: 7 μm), and was evaluated in the same way, and the result is described in Table 2.

Example 18

A crosslinked rubber sample was molded in the same way as Example 1 except that the amount of FEF carbon black is changed to 85 parts by weight and that 10 parts by weight of carbon fibers are changed to 15 parts by weight of wollastonite ("NYAD 400" manufactured by TOMOE engineering; fiber length: 35 μm, fiber diameter: 7 μm), and was evaluated in the same way, and the result is described in Table 2.

Comparison Example 1

A crosslinked rubber sample was molded in the same way as Example 1 except that 80 parts by weight of FEF carbon black are changed to 80 parts by weight of SRF-LM carbon black ("Asahi #50" manufactured by NSCC Carbon; average particle diameter: 80 nm, iodine adsorption: 23 g/kg, DBP oil absorption: 63 ml/100 g), and was evaluated in the same way, and the result is described in Table 3.

Comparison Example 2

A crosslinked rubber sample was molded in the same way as Example 1 except that 80 parts by weight of FEF carbon black are changed to 10 parts by weight of MAF carbon black ("Asahi #60H" manufactured by NSCC Carbon; average particle diameter: 41 nm, iodine adsorption: 50 g/kg, DBP oil absorption: 124 ml/100 g), and was evaluated in the same way, and the result is described in Table 3.

Comparison Example 3

A crosslinked rubber sample was molded in the same way as Example 1 except that 80 parts by weight of FEF carbon black are changed to 80 parts by weight of SRF-LM carbon black ("Asahi #50" manufactured by NSCC Carbon; average particle diameter: 80 nm, iodine adsorption: 23 g/kg, DBP oil absorption: 63 ml/100 g) and that 10 parts by weight of carbon fibers are changed to 10 parts by weight of wollastonite ("NYAD-400" manufactured by TOMOE engineering), and was evaluated in the same way, and the result is described in Table 3.

Comparison Example 4

A crosslinked rubber sample was molded in the same way as Example 1 except that 80 parts by weight of FEF carbon black are changed to 80 parts by weight of MAF carbon black ("Asahi #60H" manufactured by NSCC Carbon; average particle diameter: 41 nm, iodine adsorption: 50 g/kg, DBP oil absorption: 124 ml/100 g) and that 10 parts by weight of carbon fibers are changed to 10 parts by weight of wollastonite, and was evaluated in the same way, and the result is described in Table 3.

Comparison Example 5

A crosslinked rubber sample was molded in the same way as Example 1 except that 10 parts by weight of carbon fibers are changed to 10 parts by weight of silicon carbide ("Diyasic OY-20" manufactured by YAKUSHIMA DENKO), and was evaluated in the same way, and the result is described in Table 3.

Comparison Example 6

A crosslinked rubber sample was molded in the same way as Example 1 except that 10 parts by weight of carbon fibers are changed to 10 parts by weight of titanium dioxide ("Tipaque A-100" manufactured by ISHIHARA SANGYO KAISHA, LTD.), and was evaluated in the same way, and the result is described in Table 3.

Comparison Example 7

A crosslinked rubber sample was molded in the same way as Example 1 except that 80 parts by weight of FEF carbon black are changed to 80 parts by weight of MAF carbon black ("Asahi #60H" manufactured by NSCC Carbon; average particle diameter: 41 nm, iodine adsorption: 50 g/kg, DBP oil absorption: 124 ml/100 g) and that 10 parts by weight of carbon fibers are changed to 10 parts by weight of titanium dioxide ("Tipaque A-100" manufactured by ISHIHARA SANGYO KAISHA, LTD.), and was evaluated in the same way, and the result is described in Table 3.

Comparison Example 8

A crosslinked rubber sample was molded in the same way as Example 1 except that the amount of FEF carbon black is changed to 70 parts by weight, and was evaluated in the same way, and the result is described in Table 3.

Comparison Example 9

A crosslinked rubber sample was molded in the same way as Example 1 except that the amount of FEF carbon black is changed to 90 parts by weight, and was evaluated in the same way, and the result is described in Table 3.

Comparison Example 10

A crosslinked rubber sample was molded in the same way as Example 1 except that the amount of FEF carbon black is changed to 70 parts by weight and that 10 parts by weight of carbon fibers are changed to 10 parts by weight of wollastonite ("NYAD 400" manufactured by TOMOE engineering; fiber length: 35 μm, fiber diameter: 7 μm), and was evaluated in the same way, and the result is described in Table 3.

Comparison Example 11

A crosslinked rubber sample was molded in the same way as Example 1 except that the amount of FEF carbon black is changed to 90 parts by weight and that 10 parts by weight of carbon fibers are changed to 10 parts by weight of wollastonite ("NYAD 400" manufactured by TOMOE engineering; fiber length: 35 μm, fiber diameter: 7 μm), and was evaluated in the same way, and the result is described in Table 3.

Comparison Example 12

A crosslinked rubber sample was molded in the same way as Example 1 except that the amount of carbon fibers is changed to 2.5 parts by weight, and was evaluated in the same way, and the result is described in Table 3.

Comparison Example 13

A crosslinked rubber sample was molded in the same way as Example 1 except that the amount of carbon fibers is changed to 25 parts by weight, and was evaluated in the same way, and the result is described in Table 3.

Comparison Example 14

A crosslinked rubber sample was molded in the same way as Example 1 except that 10 parts by weight of carbon fibers are changed to 2.5 parts by weight of wollastonite, and was evaluated in the same way, and the result is described in Table 3.

Comparison Example 15

A crosslinked rubber sample was molded in the same way as Example 1 except that 10 parts by weight of carbon fibers are changed to 25 parts by weight of wollastonite ("NYAD 400" manufactured by TOMOE engineering; fiber length: 35 μm, fiber diameter: 7 μm), and was evaluated in the same way, and the result is described in Table 3.

TABLE 1

| | | | | | | | | | (parts by weight) |
|---|---|---|---|---|---|---|---|---|---|
| | Example 1 | Example 2 | Example 3 | Example 4 | Example 5 | Example 6 | Example 7 | Example 8 | Example 9 |
| HNBR | 100 | 100 | 100 | 100 | 100 | 100 | 100 | 100 | 100 |
| FEF carbon black | 80 | 75 | 85 | 80 | 80 | 75 | 75 | 85 | 85 |
| SRF carbon black | | | | | | | | | |
| MAF carbon black | | | | | | | | | |
| carbon fber | 10 | 10 | 10 | 7.5 | 15 | 7.5 | 15 | 7.5 | 15 |
| wollastonite | | | | | | | | | |
| silicon carbide | | | | | | | | | |
| titanium dioxide | | | | | | | | | |
| organic peroxide | 4 | 4 | 4 | 4 | 4 | 4 | 4 | 4 | 4 |
| Taber abrasion amount (mg) | 54 | 70 | 82 | 89 | 103 | 107 | 96 | 86 | 107 |
| hysteresis loss (J) | 3.0 | 3.0 | 2.9 | 2.2 | 1.7 | 3.0 | 2.0 | 1.8 | 1.5 |

TABLE 2

| | | | | | | | | | (parts by weight) |
|---|---|---|---|---|---|---|---|---|---|
| | Example 10 | Example 11 | Example 12 | Example 13 | Example 14 | Example 15 | Example 16 | Example 17 | Example 18 |
| HNBR | 100 | 100 | 100 | 100 | 100 | 100 | 100 | 100 | 100 |
| FEF carbon black | 80 | 75 | 85 | 80 | 80 | 75 | 75 | 85 | 85 |
| SRF carbon black | | | | | | | | | |
| MAF carbon black | | | | | | | | | |
| carbon fber | | | | | | | | | |
| wollastonite | 10 | 10 | 10 | 7.5 | 15 | 7.5 | 15 | 7.5 | 15 |
| silicon carbide | | | | | | | | | |
| titanium dioxide | | | | | | | | | |
| organic peroxide | 4 | 4 | 4 | 4 | 4 | 4 | 4 | 4 | 4 |
| Taber abrasion amount (mg) | 98 | 102 | 108 | 105 | 70 | 109 | 80 | 107 | 83 |
| hysteresis loss (J) | 2.6 | 2.7 | 2.4 | 3.0 | 2.8 | 3.0 | 2.7 | 2.7 | 2.5 |

TABLE 3

| | Comparison Example 1 | Comparison Example 2 | Comparison Example 3 | Comparison Example 4 | Comparison Example 5 | Comparison Example 6 | Comparison Example 7 | Comparison Example 8 | Comparison Example 9 | Comparison Example 10 | Comparison Example 11 | Comparison Example 12 | Comparison Example 13 | Comparison Example 14 | Comparison Example 15 |
|---|---|---|---|---|---|---|---|---|---|---|---|---|---|---|---|
| | | | | | | | | | | | | | | | (parts by weight) |
| HNBR | 100 | 100 | 100 | 100 | 100 | 100 | 100 | 100 | 100 | 100 | 100 | 100 | 100 | 100 | 100 |
| FE carbon black | | | | | 80 | 80 | | 70 | 90 | 70 | 90 | 80 | 80 | 80 | 80 |
| SRF carbon black | 80 | | 80 | | | | | | | | | | | | |
| MAF carbon black | | 80 | | 80 | | | 80 | | | | | | | | |
| carbon fiber | 10 | 10 | | | | | | 10 | 10 | | | 2.5 | 25 | | |
| wollastonite | | | 10 | 10 | | | | | | 10 | 10 | | | 2.5 | 25 |
| silicon carbide | | | | | 10 | | | | | | | | | | |
| titanium dioxide | | | | | | 10 | 10 | | | | | | | | |
| organic peroxide | 4 | 4 | 4 | 4 | 4 | 4 | 4 | 4 | 4 | 4 | 4 | 4 | 4 | 4 | 4 |
| Taber abrasion amount (mg) | 124 | 197 | 244 | 258 | 113 | 128 | 223 | 78 | 115 | 119 | 152 | 181 | 173 | 236 | 245 |
| hysteresis loss (J) | 2.1 | 2.5 | 1.4 | 1.6 | * | * | * | 3.5 | 2.9 | 2.9 | 2.1 | 2.4 | 1.5 | 2.5 | 3.5 |

* unmeasurable because of test piece breakage

<Evaluation>

From Examples and Comparison Examples 1 to 4, it becomes clear that FEF carbon black is optimum for the carbon black used for satisfying the abrasion resistance characteristics and the pressure resistance characteristics and that RF-LM carbon black and MAF carbon black are inferior in the abrasion resistance characteristics.

From Examples and Comparison Examples 8 to 10, it can be confirmed that the abrasion resistance characteristics and the pressure resistance characteristics are satisfied when the amount of carbon black is within an extremely limited range of 75 to 85 parts by weight.

Although it has been known that carbon black is added for supplementing high strength and abrasion resistance characteristics and the addition of a large amount of carbon black is disclosed in prior art, the present invention makes it clear that the addition within an extremely limited range is important for satisfying the abrasion resistance characteristics and the pressure resistance characteristics. Additionally, with regard to the type of carbon black, it is revealed that extremely limited carbon black can satisfy the abrasion resistance characteristics and the pressure resistance characteristics.

On the other hand, from Examples and Comparison Examples 5, 6, and 7, it can be confirmed that, among other fillers, carbon fibers or wollastonite is optimum for the hard filler used for satisfying the abrasion resistance characteristics and the pressure resistance characteristics.

From Examples and Comparison Examples 12 to 15, it can be confirmed that the effect is produced when an amount of the hard filler is an amount of 3 to 20.

Particularly, it is understood that an increase in amount of carbon fibers tends to increase the Taber abrasion amount (degrade the abrasion resistance characteristics) and decrease the hysteresis loss (improve the pressure resistance characteristics).

It becomes clear that the addition of the hard filler within an extremely limited range is also important.

We claim:

1. An HNBR composition containing 3 to 20 parts by weight of carbon fibers or wollastonite fibers as a hard filler per 100 parts by weight of a hydrogenated nitrile rubber and containing 72 to 87 parts by weight of a carbon black having an average particle diameter of 40 to 50 nm, an iodine adsorption of 35 to 49 g/kg, and a DBP oil absorption of 100 to 160 ml/100 g.

2. The HNBR composition according to claim 1, wherein the carbon black is FEF carbon black or FEF-LS carbon black.

3. An HNBR crosslinked body acquired by crosslinking the HNBR composition according to claim 1 or 2.

4. Use of the HNBR crosslinked body according to claim 3 as a sealing material in a pulley portion for CVT.

5. A sealing material in a pulley portion for CVT acquired by molding the HNBR crosslinked body according to claim 3.

6. The sealing material in a pulley portion for CVT according to claim 5, wherein the sealing material is a D-ring.

7. An HNBR crosslinked body acquired by crosslinking the HNBR composition according to claim 2.

8. Use of the HNBR crosslinked body according to claim 7 as a sealing material in a pulley portion for CVT.

9. A sealing material in a pulley portion for CVT acquired by molding the HNBR crosslinked body according to claim 7.

10. The sealing material in a pulley portion for CVT according to claim 9, wherein the sealing material is a D-ring.

* * * * *